United States Patent
Fermann et al.

(10) Patent No.: US 9,787,051 B2
(45) Date of Patent: Oct. 10, 2017

(54) COMPACT OPTICAL FREQUENCY COMB SYSTEMS

(71) Applicants: Martin E. Fermann, Dexter, MI (US); Thomas R. Schibli, Boulder Creek, CO (US); Ingmar Hartl, Hamburg (DE)

(72) Inventors: Martin E. Fermann, Dexter, MI (US); Thomas R. Schibli, Boulder Creek, CO (US); Ingmar Hartl, Hamburg (DE)

(73) Assignees: The Regents of the University of Colorado, a body corporate, Denver, CO (US); IMRA AMERICA, INC., Ann Arbor, MI (US)

( * ) Notice: Subject to any disclaimer, the term of this patent is extended or adjusted under 35 U.S.C. 154(b) by 0 days.

(21) Appl. No.: 14/325,721

(22) Filed: Jul. 8, 2014

(65) Prior Publication Data

US 2014/0321483 A1    Oct. 30, 2014

Related U.S. Application Data (63) Continuation of application No. 13/481,211, filed on May 25, 2012, now Pat. No. 8,792,525.

(Continued)

(51) Int. Cl.
*H01S 3/10* (2006.01)
*H01S 3/11* (2006.01)
(Continued)

(52) U.S. Cl.
CPC ........ *H01S 3/1115* (2013.01); *H01S 3/08059* (2013.01); *H01S 3/105* (2013.01);
(Continued)

(58) Field of Classification Search
CPC .... H01S 3/08059; H01S 3/105; H01S 3/1118; H01S 3/1115; H01S 3/06712;
(Continued)

(56) References Cited

U.S. PATENT DOCUMENTS

| | | |
|---|---|---|
| 5,440,573 A | 8/1995 | Fermann |
| 5,796,761 A | 8/1998 | Injeyan et al. |

(Continued)

FOREIGN PATENT DOCUMENTS

| | | |
|---|---|---|
| FR | 2920538 A1 | 3/2009 |
| JP | 2005322864 | 11/2005 |

(Continued)

OTHER PUBLICATIONS

J. M. Dawlaty et al., 'Probing Ultrafast Dynamics of Electrons and Holes in Graphene', Optical Society of America Conf. on Lasers and Electro-Optics, paper CFU7 (2008).

(Continued)

*Primary Examiner* — Yuanda Zhang
(74) *Attorney, Agent, or Firm* — Sughrue Mion, PLLC; Richard C. Turner (57) ABSTRACT

Compact optical frequency sources are described. The comb source may include an intra-cavity optical element having a multi-material integrated structure with an electrically controllable active region. The active region may comprise a thin film. By way of example, the thin film and an insulating dielectric material disposed between two electrodes can provide for rapid loss modulation. In some embodiments the thin film may comprise graphene. In various embodiments of a frequency comb laser, rapid modulation of the CEO frequency can be implemented via electric modulation of the transmission or reflection loss of an additional optical element, which can be the saturable absorber itself. In another embodiment, the thin film can also be used as a saturable absorber in order to facilitate passive modelocking. In some implementations the optical element may be formed on a cleaved or polished end of an optical fiber.

15 Claims, 3 Drawing Sheets

Related U.S. Application Data (60) Provisional application No. 61/490,991, filed on May 27, 2011.

(51) Int. Cl.
  *H01S 3/08* (2006.01)
  *H01S 3/105* (2006.01)
  *H01S 3/067* (2006.01)
  *H01S 3/16* (2006.01)
  *H01S 3/00* (2006.01)
  *H01S 3/17* (2006.01)

(52) U.S. Cl.
  CPC ........... *H01S 3/1118* (2013.01); *H01S 3/0092* (2013.01); *H01S 3/06712* (2013.01); *H01S 3/06725* (2013.01); *H01S 3/10046* (2013.01); *H01S 3/1053* (2013.01); *H01S 3/1616* (2013.01); *H01S 3/176* (2013.01)

(58) Field of Classification Search
  CPC ............... H01S 3/06725; H01S 3/0092; H01S 3/10046; H01S 3/1053; H01S 3/176; H01S 3/1616
  See application file for complete search history.

(56) References Cited

U.S. PATENT DOCUMENTS

| | | | |
|---|---|---|---|
| 6,263,004 B1* | 7/2001 | Arvidsson | H01S 3/0627 372/11 |
| 6,785,303 B1 | 8/2004 | Holzwarth | |
| 6,819,690 B2 | 11/2004 | Kartner | |
| 7,162,109 B2 | 1/2007 | Nakada et al. | |
| 7,313,291 B2 | 12/2007 | Okhotnikov et al. | |
| 7,809,222 B2 | 10/2010 | Hartl | |
| 7,933,300 B2 | 4/2011 | Jiang | |
| 8,488,639 B1 | 7/2013 | Diels et al. | |
| 8,554,022 B1* | 10/2013 | Hochberg | H01L 29/66977 257/21 |
| 2005/0146779 A1* | 7/2005 | Okhotnikov et al. | 359/321 |
| 2006/0114946 A1 | 6/2006 | Sun et al. | |
| 2006/0222024 A1 | 10/2006 | Gray et al. | |
| 2008/0192780 A1 | 8/2008 | Luo et al. | |
| 2009/0034899 A1 | 2/2009 | Fattal et al. | |
| 2009/0284828 A1* | 11/2009 | Sosabowski | H01S 3/1115 359/326 |
| 2009/0310631 A1 | 12/2009 | Kaertner et al. | |
| 2010/0195677 A1* | 8/2010 | Fermann et al. | 372/6 |
| 2010/0207520 A1 | 8/2010 | Zhu et al. | |
| 2010/0225897 A1 | 9/2010 | Fermann | |
| 2010/0265972 A1* | 10/2010 | Hartl et al. | 372/18 |
| 2011/0006837 A1 | 1/2011 | Wang | |
| 2011/0019700 A1 | 1/2011 | Jiang et al. | |
| 2011/0222562 A1* | 9/2011 | Jiang et al. | 372/6 |
| 2012/0039344 A1* | 2/2012 | Kian | H01S 3/1118 372/6 |
| 2012/0133931 A1 | 5/2012 | Fermann | |
| 2012/0243874 A1 | 9/2012 | Logan | |
| 2016/0094008 A1 | 3/2016 | Fermann | |

FOREIGN PATENT DOCUMENTS

| | | |
|---|---|---|
| JP | 2008522432 | 6/2008 |
| JP | 2010524172 | 7/2010 |
| WO | 2006060160 A1 | 6/2006 |
| WO | 2008123833 A1 | 10/2008 |
| WO | 2010065788 A1 | 6/2010 |
| WO | 2010120246 A1 | 10/2010 |

OTHER PUBLICATIONS

Ming Liu et al., 'A graphene-based broadband optical modulator', Nature vol. 474, pp. 64-67 Published: (Jun. 2, 2011) Published online May 8, 2011 DOI:doi:10.1038/nature10067.

A. Martinez et al., 'Optical Deposition of graphene and carbon nanotubes in a fiber ferrule for passive mode-locked lasing', Opt. Express, vol. 18, pp. 23054 (2010).

S. Osterman et al., "A proposed laser frequency comb-based wavelength reference for high resolution spectroscopy," Proc. SPIE 6693, 66931G (2007).

J.H.V. Price, 'Supercontinuum generation and nonlinearity in soft glass fibers', in chapter VI of J. M. Dudley et al., 'Supercontinuum generation in optical fibers', Cambridge University Press (2010).

T.R. Schibli et al., 'Control of Q-switching instabilities in passively mode-locked lasers', Optical Society of America, TOPS vol. 68 Advanced Solid State Lasers, pp. 498 (2002).

T.R. Schibli et al., Control of Q-switched mode locking by active feedback, Opt. Lett. 26, 148-150 (2001).

International Search Report, PCT/US2012/039509, Sep. 6, 2012.

Chinese Office Action (Notification of First Office Action), issued Jan. 22, 2015; Application No. 201280024324.8.

JP 2014-512131 Japanese Office Action (Notice of Reason for Refusal), issued Mar. 31, 2016; English translation received Apr. 27, 2016.

Ref 3; Compound Q switch a hybrid Q-switching of diode-pumped microchip laser with a flexible saturable-absorber mirror, Keio University Azusa Inoue, The JP Society of Applied Physics & Related Societies No. 3; Mar. 2006 p. 135A.

Hudson et al., 'Mode-locked fiber laser frequency-controlled with an intracavity electro-optic modulator', Optics Letters, vol. 30, pp. 2948-2950 (2005).

Hudson et al., Mode-locked fiber laser: Development and Application, Thesis, B.S., Centre College, 2009.

N. Kuse et al., Ultra-low noise all polarization-maintaining Er fiber-based optical frequency combs facilitated with a graphene modulator, Opt. Express., vol. 23, pp. 24342-24350) 2015 on p. 24347 last paragraph.

C.C.Lee et al., "Frequency comb stabilization with bandwidth beyond the limit of gain lifetime by an intracavity graphene electro-optic modulator", Opt. Lett., vol. 37, pp. 3084-3086 (2012).

https://www.rp-photonics.com/semiconductor_saturable_absorber_mirrors.html.

https://www.rp-photonics.com/kramers_kronig_relations.html.

JP2014-512131 EN trans of amendment filed Sep. 13, 2016 in response to Office Action dated Mar. 24, 2016.

JP2014-512131 EN trans of Argument filed Sep. 13, 2016 in response to Office Action dated Mar. 24, 2016.

* cited by examiner

COMPACT OPTICAL FREQUENCY COMB SYSTEMS

This is a Continuation Application of U.S. application Ser. No. 13/481,211 filed May 25, 2012, which claims benefit of U.S. Provisional Application No. 61/490,991 filed May 27, 2011. The above-noted applications are incorporated herein by reference.

FIELD OF THE INVENTION

The invention relates to compact optical frequency comb systems and exemplary applications thereof.

BACKGROUND

High brightness broadband optical frequency comb sources have many applications in medicine, spectroscopy, microscopy, ranging, sensing and metrology. Such sources need to be highly robust, have long term stability, and also comprise a minimal component count with a high degree of optical integration for mass market applications. Especially, broadband optical frequency comb sources based on passively modelocked lasers in conjunction with frequency broadening or supercontinuum generation in highly nonlinear fibers or waveguides have generated of lot of interest. Particularly when used in conjunction with short pulse fiber lasers, an all-fiber system construction is possible for supercontinuum generation which results in benefits such as greatly simplified manufacturing routines, low cost and high levels of thermo-mechanical stability.

Fiber based supercontinuum sources can produce spectral output from the UV to the mid-IR and have attracted a vast amount of research in the last few years, see for example J. M. Dudley et al., 'Supercontinuum generation in optical fibers', Cambridge University Press (2010). To reach the mid-IR, for example the wavelength range from about 2.5-10.0 μm, soft glasses or heavy metal oxide glasses may be implemented for supercontinuum generation, as recently reviewed by J. H. V. Price et al., 'Supercontinuum generation and nonlinearity in soft glass fibers', in chapter VI of J. M. Dudley et al., 'Supercontinuum generation in optical fibers', Cambridge University Press (2010). Such fiber based mid-IR sources operating in the mid-IR can potentially replace more established optical parametric oscillators (OPOs), amplifiers (OPAs) and generators (OPGs) and are therefore very actively pursued.

Optical fiber frequency combs are conveniently constructed from mode locked lasers by controlling both the repetition rate as well as the carrier envelope offset frequency (CEO) inside the laser resonator, as for example disclosed in U.S. Pat. No. 6,785,303 to Holzwarth et al. The repetition rate of a resonator can be modulated at MHz repetition rates using piezo-electric transducers or electro-optic transducers as well known in the state of the art. In contrast, in '303 it is suggested to use much slower modulation mechanisms for the control of the CEO frequency, for example, modulation of the optical pump power coupled into the laser resonator.

Methods for rapid control of the CEO frequency were disclosed in U.S. patent application pub. No. 2010/0195677, ('677) 'Pulsed Laser Sources', to Fermann et al., where incorporation of an addressable intra-cavity component was suggested for carrier phase control. For example, various configurations included rapid control of the pressure of a fiber Bragg grating, control of fiber Bragg grating temperature, and/or multiple feedback loops to decouple any dependency between the repetition rate and the CEO frequency. Other techniques to introduce controllable phase variation were also suggested.

Rapid control of the CEO frequency was further suggested in U.S. patent application pub. no. 2010/0225897, entitled 'Optical scanning and imaging systems based on dual pulsed laser systems', to Fermann et al., via the control of the intra-cavity loss inside a mode locked laser resonator. In particular the incorporation of an acousto-optic modulator enables the control of the CEO frequency at MHz modulation rates, many orders of magnitude faster than possible with optical pump modulation. The contents of the '677 and '897 applications are hereby incorporated by reference in their entirety.

Passively mode locked lasers generally require an intra-cavity saturable absorber to favor short pulse operation over cw operation, where additional design criteria have to be met to suppress Q-switching instabilities. Recently saturable absorbers based on graphene to facilitate modelocking have been suggested in J. M. Dawlaty et al., Probing Ultrafast Dynamics of Electrons and Holes in Graphene, Optical Society of America Conf. on Lasers and Electro-Optics, paper CFU7 (2008). Graphene based saturable absorbers can be directly deposited on optical gain materials such as optical fibers as discussed in A. Martinez et al., Optical Deposition of graphene and carbon nanotubes in a fiber ferrule for passive mode-locked lasing, Opt. Express, vol. 18, pp. 23054 (2010) and are therefore of great interest.

However, to date, passively mode locked lasers and optical frequency combs or in particularly passively mode locked fiber lasers and fiber based frequency combs are still relatively difficult to manufacture, have a large component count and their high cost prevents their use in mass applications.

SUMMARY OF THE INVENTION

Compact optical frequency comb systems based on passively mode locked lasers and fiber lasers are described. In at least one embodiment compact system construction can be obtained by depositing a saturable absorber medium directly onto the cleaved or polished surface of an optical fiber. The saturable absorber can thus be spliced directly to other fiber components for the construction of a compact fiber laser cavity. The optical frequency comb sources can be designed to operate at GHz repetition rates for the construction of optical frequency combs with large comb spacing.

The frequency comb spacing can be controlled using standard transducers such as piezo-electric or conventional electro-optic elements. In various embodiments rapid modulation of the CEO frequency can be implemented via electric modulation of the transmission or reflection loss of an additional optical element, which can be the saturable absorber itself.

By way of example, a thin graphene film and an insulating dielectric material sandwiched between two electrodes can provide for rapid loss modulation. Alternatively, the graphene thin film can be used as a transparent electrode. The loss modulation element can be used as a cavity end mirror or in transmission. Moreover, the loss modulator can be directly deposited onto the surface of a fiber.

In some embodiments the graphene film can be omitted and repetition rate control inside a cavity can be implemented via electro-optic modulation of the refractive index of the dielectric material. This can be used in conjunction with precision temperature control of the fiber cavity.

In another embodiment, the graphene film can also be used as a saturable absorber in order to facilitate passive modelocking. Self-starting operation of modelocking can be further facilitated and Q-switching inside the laser resonator can be suppressed using loss modulation of the graphene film.

In order to generate short pulses with mode locked fiber lasers, dispersion compensation elements such as chirped fiber Bragg gratings or lengths of fiber with different dispersion parameters can be incorporated inside the resonator. In addition, simultaneous $2^{nd}$ and $3^{rd}$ order dispersion compensation can be implemented, which is particularly useful for the operation of passively mode locked fiber lasers at wavelengths>1700 nm. The optical bandwidth of the generated pulses can further be extended by using positive dispersion fibers with small core diameters in conjunction with negative dispersion fibers with larger core diameters, thus facilitating the oscillation of similariton or parabolic pulses inside the oscillator.

Octave spanning super continuum spectra can be generated by splicing highly nonlinear fibers directly to the output of the passively mode locked fiber oscillators, where additional fiber amplifier or pulse compression stages can also be used upstream of the highly nonlinear fibers.

In various embodiments Raman shifting in conjunction with difference frequency generation can also be implemented to increase the spectral coverage of the frequency comb system.

The individual comb lines are rapidly tunable by the implementation of cavity length tuning. The fiber laser output can further be locked to a single-frequency laser such as a quantum cascade laser to produce a rapidly tunable optical frequency synthesizer operating in the mid infra-red spectral region. Rapidly tunable frequency synthesizers can further be used in absorption spectroscopy.

Large comb spacing, which is obtainable using frequency comb lasers with comb spacing of several GHz, provides for resolution of individual comb lines using standard spectroscopic techniques and the implementation of broadband absorption spectroscopy. Fiber lasers with large comb spacings can also be used in the calibration of astronomical spectrographs.

Low phase noise micro-wave sources can be constructed using fiber comb lasers with large comb spacing by locking the comb laser to a precision optical reference frequency using a micro-wave beat signal between the optical reference and the comb laser.

At least one embodiment includes a laser having an intra-cavity optical element external to the laser gain medium. The optical element may comprise a multi-material integrated structure, for example a multilayer device having an electrically controllable active region, which may be a thin film layer. The active region may be disposed in combination with various conductive, dielectric, and/or semiconductor materials and may be configured to operate in either transmission or reflection. The element may be operable as a saturable absorber while being capable of modulating the loss of the laser cavity and/or the cavity path length via external electrical control. In some implementations the optical element may be formed on a cleaved or polished end of an optical fiber.

DETAILED DESCRIPTION

Figure 1:
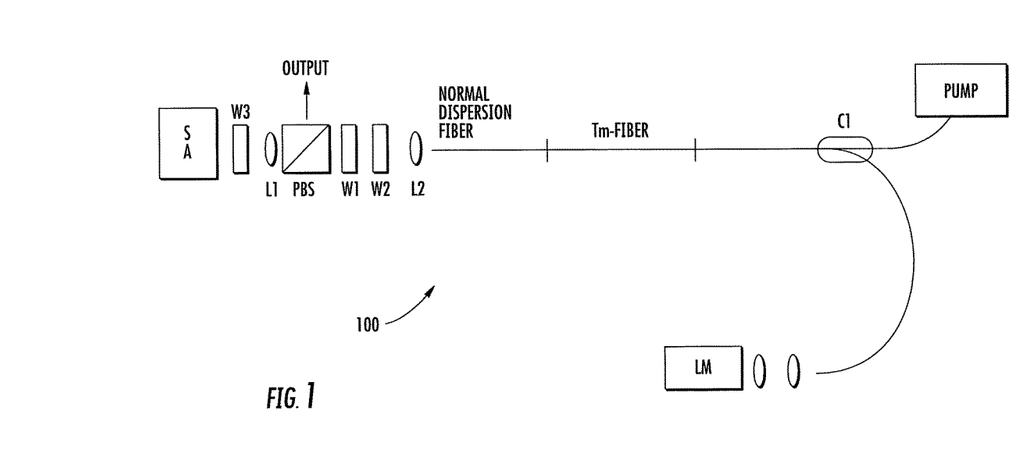
FIG. 1 schematically illustrates a passively mode locked fiber laser incorporating a graphene based loss modulator for carrier envelope offset frequency control.

Several components of a passively mode locked fiber oscillator 100 optimized for the generation of short pulses and broad coherent spectra are shown in FIG. 1. In an exemplary embodiment, a Tm-doped silica fiber can be used as the gain medium, although any other rare-earth dopants are also possible. A Tm doped alumino-silicate fiber with a numerical aperture of NA=0.25 can be used which has negative dispersion at 1900 nm. The negative (soliton supporting) dispersion of the Tm fiber and the fiber pigtails produced by pump coupler C1 are compensated by a normal dispersion fiber. For pumping, a pump source emitting in the 1500-1650 nm wavelength range or near 790 nm can be conveniently used. The system comprises a Fabry-Perot configuration with a conventional semiconductor saturable absorber mirror SA on one cavity end and a plain gold mirror or a loss modulating mirror LM on the second distal end. Here only LM is shown. However, a conventional mirror can replace LM and be disposed in exactly the same location.

Similar laser designs were discussed in U.S. patent application Ser. No. 13/026,762 ('762) entitled "Compact, coherent, and high brightness light sources for the mid and far IR", filed Feb. 14, 2011. The contents of the '762 application are hereby incorporated by reference in their entirety.

Referring again to FIG. 1, the normal dispersion fiber compensated for both $2^{nd}$ and $3^{rd}$ order dispersion of the cavity. Waveplates W1 and W2 are used for polarization control, where conveniently a quarter and a half wave plate are used. Quarter wave plate W3 is used for adjustable output coupling, where the output from the cavity is taken from a reflection of the intra-cavity polarization beam splitter as indicated in FIG. 1.

When adjusting the cavity dispersion to be positive, high energy similariton or parabolic pulses can be generated with proper adjustment of the intra-cavity waveplates, facilitating pulse shortening via nonlinear polarization evolution and leading to the generation of pulses with a pulse energy of a few nJ at repetition rates of 100 MHz, and pulse widths<100 fs.

To provide carrier envelope offset frequency control in the cavity, a graphene based loss modulator is incorporated at the $2^{nd}$ cavity end. The repetition rate of the oscillator can be controlled via stretching a section of fiber or via mounting the SA onto a piezo-electric transducer. Such schemes are well known in the state of the art and are not further explained here.

Figure 2A:
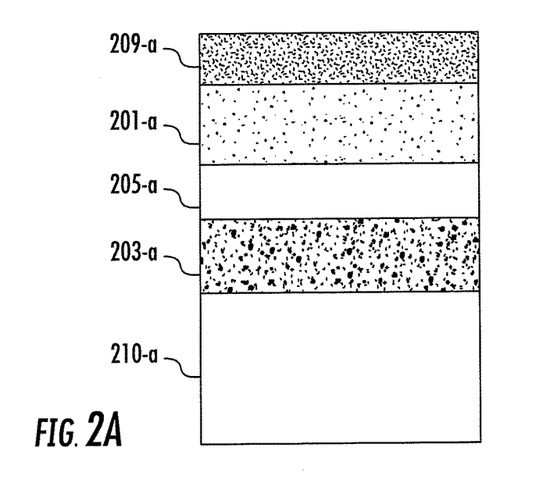
FIG. 2a schematically illustrates a graphene based loss modulator.

An example of an appropriate loss modulator (LM) is shown in FIG. 2a. The LM is deposited, for example, on a gold or suitable metal mirror consisting of a substrate 210-a and a thin gold or suitable metal film 203-a. The reflectivity of the mirror is then modulated by a thin graphene layer 201-a sandwiched between two electrodes. In this example the electrodes include two outer layers: a layer of indium tin oxide (ITO) or an optically transparent electrode 209-a and the thin gold or metal film 203-a, the latter film being deposited directly on substrate 210-a. Alternatively, graphene layer 201-a may be implemented as at least a portion of an electrode, and without the optional ITO layer 209-a. As yet another alternative, the position of the graphene and the transparent electrode can also be switched. A suitable electrical interconnection (not shown) interfaces the loss modulator to an electrical source for application of a time varying electric field for modulation. In this example, a dielectric 205-a is deposited on the gold or metal film 203-a, where the dielectric can comprise for example $SiO_2$ or $Al_2O_3$. Other dielectrics known as high k dielectrics can also be used. Preferably these high k dielectrics have high dielectric constants and are known for example from advanced MOSFET electronics designs. Appropriate materials can, for example, comprise hafnium silicate. The graphene layer 201-a is deposited on dielectric 205-a, for example by chemical vapor deposition. As discussed above, the multi-layer structure may also include optional transparent electrode material 209-a, such as indium tin oxide (ITO). An electric field can be applied to the graphene by connection to an external source (not shown) to the ITO layer 209-a and gold or metal film 203-a.

Additional buffer layers of other materials may also be deposited. Also, the layering order of the graphene film and the dielectric can be reversed. Such mirrors, which allow for a modulation of the reflectivity, were discussed in '677 and other implementations are also possible.

With an exemplary single graphene layer and a dielectric film thickness of around 100 nm, an applied voltage of around 100 V can modulate the relative reflectivity of the graphene layer by about 1%, which is more than sufficient to precisely control the carrier envelope offset frequency (CEO) inside the laser oscillator. Additional doping of the graphene layer, for example with nitric acid, can further be implemented to increase the available modulation depth with the graphene modulator. Both p as well as n doping may be incorporated. Also more than one graphene layer may be incorporated in order to optimize the performance of the loss modulator. The thicknesses of the various other films can further be controlled to maximize or minimize the field strength inside the graphene layer to optimize its performance as a loss modulator.

Other designs for a loss modulator are also possible. For example, the ITO electrode can be omitted and a second electrode can be directly attached to the graphene layer. Alternatively, the positions of the ITO electrode and the graphene layer can be switched. Such implementations are not separately shown.

In another implementation, the graphene layer can be deposited directly onto a cleaved or polished fiber end, which is preferably held in a ferrule. The dielectric and gold films are then deposited on top of the graphene, eliminating the need for a separate substrate. With such a configuration a very compact design can be implemented. Such an implementation is not separately shown, but a similar device is discussed below with respect to FIGS. 2b and 2c.

Figure 2B:
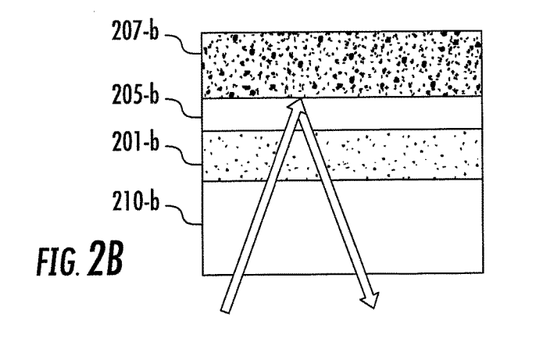
FIG. 2b schematically illustrates an alternative embodiment of a graphene based loss modulator.

Another alternative configuration for a loss modulator is shown in FIG. 2b. In this configuration, the loss modulator is operated in reflection by passing the light through the substrate 210-b. The direction of light is indicated by the thick arrows. Preferably the light is propagated through the sample at an angle to avoid unwanted Fabry-Perot resonances from the substrate. The substrate 210-b is further preferably anti-reflection coated at the operation wavelength of the laser. The light is transmitted through the dielectric film 205-b and reflected from a suitable metal film 207-b. Here the substrate can be the cleaved or polished surface of a fiber end and the individual layers can be directly deposited onto the fiber end. In this case, the light passed through the graphene layer 201-b at normal incidence. No anti-reflection coating is required in such an implementation.

Figure 2C:
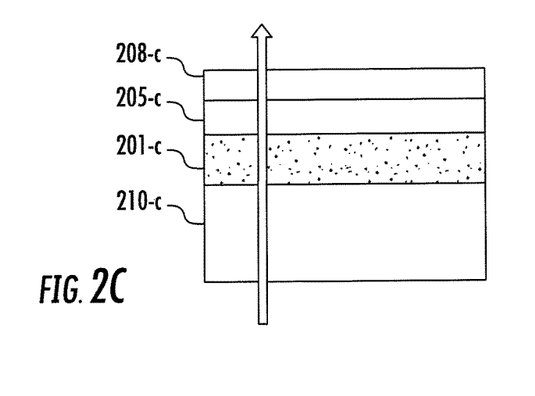
FIG. 2c schematically illustrates an alternative embodiment of a graphene based loss modulator.

In yet another alternative configuration a loss modulator can also be used in transmission as shown in FIG. 2c. In this configuration, the loss modulator is configured for passing the light through the substrate 210-c, thus a gold mirror is not required. In this example the loss modulator also comprises a transparent electrode 208-c, dielectric 205-c, and graphene layer 201-c. The direction of light propagation is indicated with the arrow. To avoid unwanted surface reflection, both external surfaces of the loss modulator can be anti-reflection coated and light propagation through the devices can be performed at the Brewster angle or away from normal incidence. As in FIG. 2b, the structure can also be directly deposited onto a fiber surface, eliminating the need for a substrate. Such loss modulators are particularly useful in the design of integrated fiber ring cavities.

All of the structures shown in FIGS. 2a to 2c can also contain additional films to further improve the performance of the system. Appropriate ring laser design allowing for the incorporation of a structure as shown in FIG. 2c were for example discussed in '677 and are not further described here.

In all of the structures shown in FIGS. 2a to 2c, the loss modulation function can also be combined with a saturable loss in order to operate the devices as saturable absorbers. With respect to FIG. 1, the device as shown in FIG. 2a can thus be used on one end of the cavity, eliminating the need for a separate saturable absorber mirror. For example, the typical saturation intensity of graphene based saturable absorbers is of the order of 50-300 $MW/cm^2$, which is ideal for operation as a saturable absorber in a passively mode locked fiber laser. In addition, the saturable absorber relaxation time of a graphene based saturable absorber can be as short as 10 fs with a secondary time constant of around 1 ps as well as some longer time constants. The very short relaxation time of graphene thus also eliminates the need for nonlinear polarization evolution for the production of very short pulses in a passively mode locked fiber laser.

As discussed above, multi-material devices as shown in the examples of FIGS. 2a-2c may be utilized as intra-cavity optical elements for loss modulation and/or for optical path length modulation. The devices may be used as a saturable absorber for passive mode locking and may be joined to an optical fiber so as to create a very compact laser source. Moreover, in some embodiments, an active mode locking arrangement may be utilized, for example via loss modulation with the graphene layer at a repetition rate precisely synchronized with the laser cavity round-trip time, the manner of implementation of which would be readily appreciated by one of skill in the art. Such an arrangement provides for control of mode locked operation by an external source, and in a compact configuration.

Figure 3:
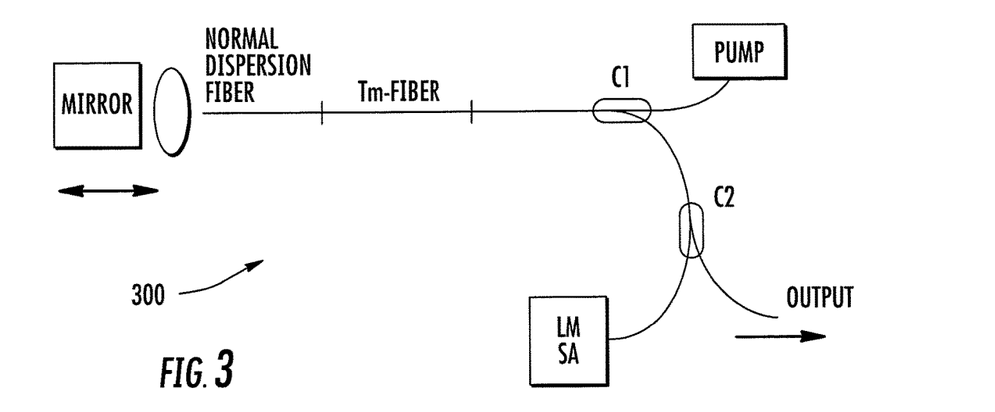
FIG. 3 schematically illustrates a passively mode locked fiber laser incorporating a graphene based saturable absorber, which also allows for rapid internal loss modulation.

An exemplary design of a mode locked fiber laser 300 incorporating a graphene based saturable absorber and loss modulator is shown in FIG. 3. The design is similar to the design shown in FIG. 1, however, the separate saturable absorber mirror is eliminated and replaced with the loss modulator/saturable absorber element LMSA as discussed with respect to FIGS. 2a-2c. The LMSA is located at the second cavity end. The mirror located at the first cavity end is further mounted on a piezo-electric transducer to enable rapid cavity length control. The intra-cavity lens focuses onto the plain mirror. The output of the laser is taken via coupler C2, which typically comprises a coupler with a splitting ratio between 1:9 and 9:1. Also polarization maintaining components and intra-cavity polarizers can be incorporated to minimize polarization fluctuations in the output from the laser.

Figure 4:
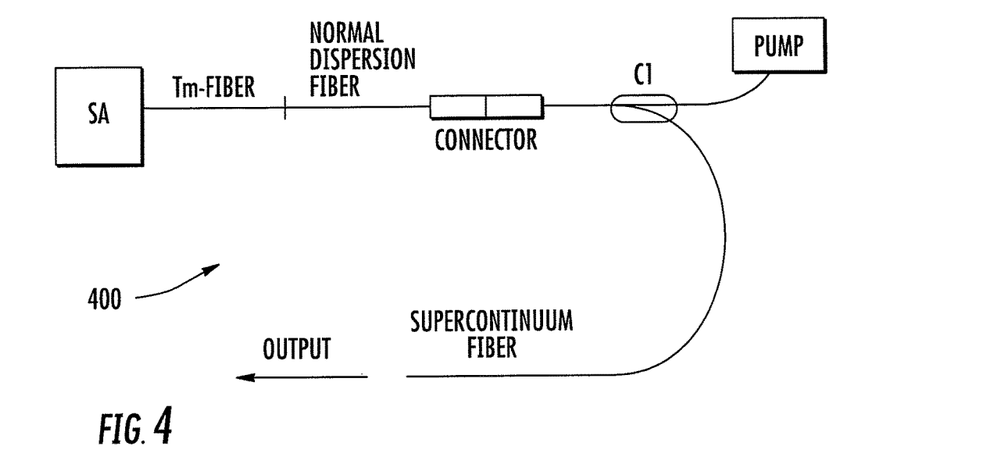
FIG. 4 schematically illustrates a compact fiber based frequency comb source based on a passively mode locked fiber laser incorporating a graphene based saturable absorber, which also allows for rapid internal loss modulation in conjunction with super continuum generation.

An exemplary design of a GHz repetition rate mode locked laser 400 having a graphene based saturable absorber, and further configured for super continuum generation is shown in FIG. 4. A Fabry-Perot cavity design is shown, although ring cavity designs or other cavity configurations are also possible. The cavity extends from a saturable absorber based on graphene (SA) to the center of the fiber connector. The fiber connector comprises a dichroic mirror coated directly onto one end of a fiber ferrule to pass the pump light and partially transmit the signal light. Tm fiber lasers, Er or Yb fiber lasers or any other doped fiber materials can be used to provide gain. The pump is directed to the resonator via wavelength division multiplexing coupler C1. The dispersion inside the cavity is limited by using, for example, a negative dispersion gain fiber in conjunction with a positive dispersion undoped fiber. In case of Tm or Yb fibers, gain values of several dB/cm can be achieved, hence cavity lengths as short as 1 cm and shorter can be implemented, allowing for repetition rates>10 GHz. Also the dispersion compensating fiber can be eliminated, if the generation of pulses longer than 100 fs up to the ps range is permitted. For such short cavity lengths polarization control is not required, though polarization maintaining fibers can also be used.

The saturable absorber mirror is preferably directly deposited onto one end of the intra-cavity fiber using a design as shown in FIG. 2b, where in this example the substrate is the fiber and light passes through the graphene absorber under normal incidence.

To generate a continuum the output of the fiber laser is directed into a super continuum fiber which is preferably designed to have near zero or slightly negative dispersion at the emission wavelength of the oscillator. When using a Tm fiber oscillator, a super continuum fiber based for example on fluoride, tellurite or chalcogenide glass may be implemented to generate spectral radiation from 1,000 to 10,000 nm. Tapers inside the super continuum fibers can further be used to maximize spectral coverage. Additional pulse compression, pulse broadening and amplifier stages may also be inserted upstream of the super continuum fiber. In addition to super continuum fibers, highly nonlinear waveguides can also be used for super continuum generation. The fiber laser device shown in FIG. 4 can be easily mass produced at low cost and can be an attractive source for mid-IR generation. When using Yb fibers instead of Tm fibers, an attractive super continuum source covering the visible and near IR spectral range can be constructed.

As an alternative to super continuum generation in an optical fiber, super continuum generation in a highly nonlinear waveguide can also be used. Spectral coverage of the source can further be increased by adding difference frequency stages after super continuum generation. The spectral power density in spectral regions can further be increased by using Raman or self-frequency shifting in the highly nonlinear fibers or waveguides. Such implementations are not separately shown.

The laser shown in FIG. 4 also allows for operation of a frequency comb when implementing additional cavity length control. For example such cavity length control may be implemented with piezo-electric transducers attached to the fiber, with additional carrier phase control via pump power control, or via control of the field across the graphene based saturable absorber, or a combination thereof. Additional electronic feedback loops can further be used in conjunction with an f–2f interferometer to lock the repetition rate of the frequency comb to an external radio frequency reference signal or to an optical frequency standard and to also lock the CEO frequency to an external radio frequency signal. Such schemes are well known in the state of the art and were for example discussed in '897 as well as U.S. Pat. No. 7,809,222: Laser based frequency standards and their applications to Hartl et al. and are not further discussed here.

In some configurations, a device as shown in FIG. 2b, can also be used for cavity length control by using the change of refractive index induced by the applied electric field inside the dielectric or the graphene. For rapid length control, the graphene layer can be eliminated. Another variation for a compact frequency comb laser is possible using a graphene based saturable absorber on one end of the cavity and a cavity length modulator on the other end of the cavity. Such an implementation is not separately shown. To simplify cavity length control, the—very compact—fiber cavity can further be precision temperature controlled, minimizing the required index changes in the dielectric for control of the repetition rate.

The system shown in FIG. 3 also allows the construction of rapidly tunable frequency synthesizers. Here the cavity end mirror located at the first cavity end allows for use of a piezo actuator which modifies the repetition rate of the laser. By locking an external single frequency laser to one individual comb line a rapidly tunable frequency synthesizer can be constructed. Such systems were discussed in U.S. patent application Ser. No. 12/955,759, ('759) entitled "Frequency comb source with large comb spacing", filed Nov. 29, 2010 and are not further described here. The contents of the '759 application are hereby incorporated by reference in their entirety.

Frequency comb lasers with large comb spacing as discussed with respect to FIG. 4 can further be implemented in high resolution spectroscopy applications in combination with conventional spectroscopic elements. In such an application the output from the pulse source passes through a sample under test, for example a gas cell, before being dispersed in one or two dimensions with one grating spectrometer and a virtually imaged phase array (VIPA) as is well known in the state of the art. With sufficient comb spacing the individual comb lines can then be resolved in one or two dimensions and imaged onto a one or two dimensional detector array respectively. An optical resolution of about 1-10 GHz per pixel of the detector is thus achievable. Ultra high resolution spectrometers based on such schemes were also described in '759 and are not further discussed here.

Another attractive application of fiber frequency comb lasers with large comb spacing is as low phase noise micro-wave sources. Here the output of the comb laser is detected with a detector and converted in a radio-frequency signal at the laser repetition rate or one of its harmonics. An intra-cavity loss modulator can here be used to stabilize the output power of the fiber comb laser via an electronic feedback loop connected to the loss modulator, thus minimizing the amplitude fluctuations of the laser and minimizing the phase noise of the micro-wave source. Because of the large possible modulation bandwidth with an intra-cavity loss modulation, amplitude noise minimization via an internal loss modulator can be much more effective compared to pump power control, as is typically used in the state of the art. Preferably for a 10 GHz micro-wave reference an optical comb laser with a 10 GHz comb spacing is used, with about 1 GHz or greater being suitable. Other details of a low phase noise reference are discussed in '759 and are not further described here. Intra-cavity loss modulators as described herein can be used to suppress and enhance Q-switching instabilities in a passively mode locked laser. The suppression/enhancement of Q-switching via electronic feedback control is described in T. R. Schibli et al., "Control of Q-switching instabilities in passively mode-locked lasers, Optical Society of America, TOPS vol. 68 Advanced Solid State Lasers, pp. 498 (2002), T. R. Schibli, U. Morgner, and F. X. Kärtner, "Control of Q-switched mode locking by active feedback," Opt. Lett. 26, 148-150 (2001), and in U.S. Pat. No. 6,819,690 to Kaertner et al. A portion of the output power is detected, and a control loop acting on the loss modulator stabilizes the output power to a given value. As described in the above publications, for successful Q-switch suppression the bandwidth of the feedback control loop needs to significantly exceed the laser relaxation oscillation frequency.

In one or more embodiments enhancement of relaxation oscillations or low noise Q-switching can further be induced by modulating the cavity loss of a laser cavity at a desired modulation frequency. Such a laser cavity can contain a saturable absorber to facilitate the generation of short optical pulses. For example, a low noise Q-switched laser can contain a solid state micro-chip gain medium with a dielectric mirror on one side of a Fabry-Perot cavity and a graphene based modulator and a saturable absorber mirror on the other cavity side. The saturable absorber and the graphene modulator can also be combined in a single element. In certain preferred embodiments all optical elements can be attached to each other in an integral arrangement so as to facilitate compact system construction. Optical bonding material or direct coating can be incorporated to facilitate such attachments.

Frequency comb lasers with large comb spacings can further be used in the calibration of astronomical spectrographs, where comb spacings>10 GHz are generally sought. Depending on the application requirements, the spectral bandwidth of the comb can be anywhere in the visible or near-infrared spectral region. If visible spectral output is required, frequency comb sources discussed by employing appropriate frequency doubling, tripling or quadrupling crystals can be utilized. With respect to FIG. 4, such frequency upconversion crystals can for example be inserted after the output from the super continuum fiber. Some principles of the calibration of optical spectrographs using frequency combs is described in S. Osterman, S. Diddams, M. Beasley, C. Froning, L. Hollberg, P. MacQueen, V. Mbele, and A. Weiner, "A proposed laser frequency comb-based wavelength reference for high resolution spectroscopy," Proc. SPIE 6693, 66931G (2007). In particular, for astronomical telescope calibration, the frequency comb must be stabilized both in $f_0$ and $f_{rep}$ to a GPS disciplined microwave clock, for example a GPS disciplined Rubidium clock. If required the comb-spacing can be further increased by filter cavities before and/or after the nonlinear converters.

Thus, the invention has been described in several embodiments. It is to be understood that the embodiments are not mutually exclusive, and elements described in connection with one embodiment may be combined with, or eliminated from, other embodiments in suitable ways to accomplish desired design objectives.

At least one embodiment includes a laser generating an output. The laser includes a laser cavity comprising a solid-state or a fiber gain medium and a pump source for optically pumping the gain medium. The gain medium, in combination with the pump source, generates an intra-cavity optical beam in the laser cavity. An intra-cavity optical element is disposed external to the gain medium. The optical element is configured to modulate the loss of the laser cavity, the optical path length of the cavity, or both. The intra-cavity optical element includes at least one layer of a material operatively connected to an electrical source. The cavity loss and/or optical path length modulation are induced with an electric field generated by the source and applied to the material. The at least one layer of material is disposed between electrodes, and an intra-cavity optical beam is configured to pass through at least one of the electrodes.

In any or all embodiments the intra-cavity optical element may comprise a multimaterial integrated structure.

In any or all embodiments the intra-cavity optical element may be configured to modulate an optical path length of the laser cavity via control of an electric field applied to the material.

In any or all embodiments the intra-cavity optical element may be configured to modulate the loss and the optical path length of the laser cavity.

In any or all embodiments the material may include a layer of a dielectric.

In any or all embodiments the material may include a layer of a semiconductor.

In any or all embodiments the material may include a layer of a semiconductor and a dielectric.

In any or all embodiments the material may include a layer of a dielectric and at least one layer of graphene.

In any or all embodiments the material may include a layer of a dielectric and more than one layer of graphene.

In any or all embodiments a graphene layer may be configured as at least a portion of one of the electrodes.

In any or all embodiments the laser cavity may be configured to generate optical pulses via optical mode locking.

In any or all embodiments the laser cavity may be configured for active or passive modelocking.

In any or all embodiments the laser cavity may include a saturable absorber to induce modelocking.

In any or all embodiments the intra-cavity optical element may be configured to operate as a saturable absorber.

In any or all embodiments the intra-cavity optical element may be configured to suppress relaxation oscillations in the laser cavity.

In any or all embodiments the intra-cavity optical element may be configured to enhance relaxation oscillations in the laser cavity.

In any or all embodiments the intra-cavity optical element may be configured to stabilize the output power of the laser cavity.

In any or all embodiments a fiber gain medium may include: Nd, Yb, Bi, Er, Er/Yb, Tm, Tm/Ho or Yb/Tm doped fiber.

In any or all embodiments a fiber gain medium may include a rare-earth or transition metal doped fiber.

In any or all embodiments the laser cavity may be configured as a portion of an optical frequency comb laser, the frequency comb laser generating a train of short optical pulses, the frequency comb laser being further characterized with a pulse repetition rate and a carrier envelope offset frequency.

In any or all embodiments the intra-cavity optical element may be further configured to modulate the carrier envelope offset frequency of a frequency comb laser.

In any or all embodiments the intra-cavity optical element may configured to modulate the repetition rate of a frequency comb laser.

In any or all embodiments the intra-cavity optical element may be configured to modulate the carrier envelope offset frequency and repetition rate of the frequency comb laser.

In any or all embodiments optical pulses may directed to a highly nonlinear fiber or waveguide for super continuum generation.

In any or all embodiments an output of a highly nonlinear fiber or waveguide may be directed to at least one crystal configured for frequency up conversion or down-conversion.

In any or all embodiments a frequency down conversion process may include difference frequency mixing.

In any or all embodiments optical pulses may be directed to a highly nonlinear fiber or waveguide for frequency downconversion or upconversion of optical pulses.

At least one embodiment includes a laser having a gain medium and an intra-cavity optical element comprising a multi-material integrated structure having an electrically controllable active region comprising a film layer. The intra-cavity optical element is capable of modulating the loss of the cavity and/or the optical path length in response to an electrical signal applied to at least a portion of the active region.

In any or all embodiments the multi-material integrated structure may include multiple layers having conductive, dielectric, and/or semiconductor materials.

In any or all embodiments the intra-cavity element may operate in reflection.

In any or all embodiments the intra-cavity element may operate in transmission.

In any or all embodiments the intra-cavity element may be joined to an optical fiber.

In any or all embodiments the film layer may be disposed between two electrodes, each electrode connected to a signal source providing the electrical signal.

In any or all embodiments the film layer may include graphene, and the electrode may include at least a portion of the graphene.

In any or all embodiments the intra cavity optical element may be configured as a saturable absorber.

In any or all embodiments the laser may be configured for active mode locking, and the intra-cavity optical element may be arranged to provide loss modulation at a repetition rate synchronized with a laser cavity round-trip time.

In any or all embodiments the gain medium may be a solid state or fiber gain medium, and the intra cavity optical element may be external to the gain medium.

In any or all embodiments a gain medium may include a solid state or fiber gain medium, and the intra cavity optical element may be attached or optically bonded to the gain medium.

In any or all embodiments the intra-cavity optical element may be configured to induce Q-switching in the laser cavity.

In any or all embodiments the intra-cavity optical element may be configured to stabilize Q-switching in the laser cavity.

For purposes of summarizing the present invention, certain aspects, advantages and novel features of the present invention are described herein. It is to be understood, however, that not necessarily all such advantages may be achieved in accordance with any particular embodiment Thus, the present invention may be embodied or carried out in a manner that achieves one or more advantages without necessarily achieving other advantages as may be taught or suggested herein.

Thus, while only certain embodiments have been specifically described herein, it will be apparent that numerous modifications may be made thereto without departing from the spirit and scope of the invention. It is to be understood that the arrangements are not mutually exclusive. Elements may be combined among embodiments in suitable ways to accomplish desired design objectives. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A frequency comb laser generating an output pulse train characterized by having a repetition rate and a carrier envelope offset frequency, said frequency comb laser comprising:
    a mode locked oscillator having a laser cavity comprising a solid-state or a fiber gain medium;
    a saturable absorber to induce passive mode locking, said saturable absorber disposed in said cavity at a first cavity end;
    a pump source for optically pumping said gain medium of said mode locked oscillator; and
    an element disposed external to said gain medium, said element configured as part of said laser cavity and configured as a loss modulator to modulate the loss of said laser cavity; wherein said element comprises a material operatively connected to an electrical source, said cavity loss modulation being induced by an electric field generated by said electrical source and applied to said material in such a way as to modulate a reflectivity of said loss modulator,
    wherein said element is configured as a loss modulator located at said first cavity end and attached to said saturable absorber so as to form an integral loss modulator/saturable absorber structure (LMSA), said loss modulator operably arranged for control of one or both of said repetition rate or said carrier envelope offset frequency of said frequency comb laser,
    wherein said loss modulator/saturable absorber structure (LMSA) comprises a graphene loss modulator.

2. The frequency comb laser according to claim 1, further comprising at least one transducer for controlling frequency comb spacing.

3. The frequency comb laser according to claim 2, wherein said transducer comprises an electro-optic element.

4. The frequency comb laser according to claim 2, wherein said transducer comprises a piezo-electric element.

5. The frequency comb laser according to claim 1, further comprising a single frequency laser, said frequency comb laser and said single frequency laser being locked to each other.

6. The frequency comb laser according to claim 1, wherein said frequency comb laser is configured as a low noise microwave source, and further configured such that a micro-wave beat signal between an optical reference and a comb laser output locks the comb laser output to said optical reference.

7. The frequency comb laser according to claim 6, further comprising: a detector converting the output of the frequency comb laser to an RF signal at the laser repetition rate of one of its harmonics.

8. The frequency comb laser according to claim 1, said loss modulator further configured to stabilize the output power of said frequency comb laser.

9. The frequency comb laser according to claim 1, said loss modulator further configured to modulate one of the carrier envelope offset frequency or the repetition rate of said comb laser.

10. The frequency comb laser according to claim 1, further comprising at least one filter cavity to increase the comb spacing of said comb laser.

11. The laser according to claim 1, wherein said frequency comb laser comprises at least one dispersion compensator.

12. The laser according to claim 1, wherein said electrical field is applied via at least one transparent electrode arranged in said element.

13. The laser according to claim 1, wherein said loss modulator/saturable absorber structure is operably arranged for both carrier envelope offset frequency modulation and repetition rate control of said frequency comb laser.

14. A frequency comb laser generating an output pulse train characterized by having a repetition rate and a carrier envelope offset frequency, said frequency comb laser comprising:
   a mode locked oscillator having a laser cavity comprising a solid-state or a fiber gain medium;
   a saturable absorber to induce passive mode locking, said saturable absorber disposed in said cavity at a first cavity end;
   a pump source for optically pumping said gain medium of said mode locked oscillator; and
   an element disposed external to said gain medium, said element configured as part of said laser cavity and configured as a loss modulator to modulate the loss of said laser cavity; wherein said element comprises a material operatively connected to an electrical source, said cavity loss modulation being induced by an electric field generated by said electrical source and applied to said material in such a way as to modulate a reflectivity of said loss modulator,
   wherein said element is configured as a loss modulator located at said first cavity end and attached to said saturable absorber so as to form an integral loss modulator/saturable absorber structure (LMSA), said loss modulator operably arranged for control of one or both of said repetition rate or said carrier envelope offset frequency of said frequency comb laser, wherein said loss modulator/saturable absorber structure (LMSA) comprises at least one graphene layer, said at least one graphene layer being implemented as a portion of said loss modulator for carrier envelope offset frequency control.

15. A frequency comb laser generating an output pulse train characterized by having a repetition rate and a carrier envelope offset frequency, said frequency comb laser comprising:
   a mode locked oscillator having a laser cavity comprising a solid-state or a fiber gain medium;
   a saturable absorber to induce passive mode locking, said saturable absorber disposed in said cavity at a first cavity end;
   a pump source for optically pumping said gain medium of said mode locked oscillator; and
   an element disposed external to said gain medium, said element configured as part of said laser cavity and configured as a loss modulator to modulate the loss of said laser cavity; wherein said element comprises a material operatively connected to an electrical source, said cavity loss modulation being induced by an electric field generated by said electrical source and applied to said material in such a way as to modulate a reflectivity of said loss modulator,
   wherein said element is configured as a loss modulator located at said first cavity end and attached to said saturable absorber so as to form an integral loss modulator/saturable absorber structure (LMSA), said loss modulator operably arranged for control of one or both of said repetition rate or said carrier envelope offset frequency of said frequency comb laser, wherein said loss modulator/saturable absorber structure comprises a single graphene layer configured as a controllable loss modulator for carrier envelope offset frequency control.

* * * * *